(12) United States Patent
Purves et al.

(10) Patent No.: US 11,100,537 B2
(45) Date of Patent: Aug. 24, 2021

(54) PAYMENT DEVICE ENROLLMENT IN LINKED OFFERS

(71) Applicant: VISA INTERNATIONAL SERVICE ASSOCIATION, San Francisco, CA (US)

(72) Inventors: Thomas Purves, San Francisco, CA (US); Guyon Krug, San Francisco, CA (US); Erica Lee, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 132 days.

(21) Appl. No.: 16/454,833

(22) Filed: Jun. 27, 2019

(65) Prior Publication Data

US 2019/0318383 A1   Oct. 17, 2019

Related U.S. Application Data

(63) Continuation of application No. 15/041,917, filed on Feb. 11, 2016, now Pat. No. 10,373,199.

(51) Int. Cl.
*G06Q 30/00* (2012.01)
*G06Q 30/02* (2012.01)
*G06Q 20/12* (2012.01)
*G06Q 20/10* (2012.01)

(52) U.S. Cl.
CPC ....... *G06Q 30/0255* (2013.01); *G06Q 20/105* (2013.01); *G06Q 20/12* (2013.01)

(58) Field of Classification Search
None
See application file for complete search history.

(56) References Cited

U.S. PATENT DOCUMENTS

| | | |
|---|---|---|
| 2004/0260653 A1 | 12/2004 | Tsuei et al. |
| 2009/0182621 A1 | 7/2009 | McCourt |
| 2013/0226682 A1 | 8/2013 | Grossman |
| 2013/0232079 A1 | 9/2013 | Lindelsee et al. |
| 2013/0291123 A1 | 10/2013 | Rajkumar |
| 2015/0066670 A1 | 3/2015 | Wentker |

OTHER PUBLICATIONS

Notice of Allowance dated Mar. 27, 2019 for U.S. Appl. No. 15/041,917 (pp. 1-9).
Office Action dated Aug. 27, 2018 for U.S. Appl. No. 15/041,917 (pp. 1-15).
PCT; International Search Report and Written Opinion issued in corresponding PCT/US2017/017249 dated Apr. 14, 2017; 14 pages.
PCT International Search Report and Written Opinion issued in corresponding PCT/US2017/017249 dated Apr. 14, 2018, 14 pages.

*Primary Examiner* — Michael W Schmucker
(74) *Attorney, Agent, or Firm* — Loeb & Loeb, LLP

(57) ABSTRACT

A dynamic button object managed by a financial institution that issues a payment device prevents third-party access to sensitive account data when linking the payment device to marketing documents provided by the third party. A payment processing server uses an alias for the sensitive data and configures a dynamic button object with the alias. The object may also include instructions to link the sensitive data to the alias and allow the payment processing server to monitor transactions with the third party. The payment processing server may then mediate communication between the consumer and the third party without exposing sensitive data.

20 Claims, 4 Drawing Sheets

PAYMENT DEVICE ENROLLMENT IN LINKED OFFERS

CROSS-REFERENCE TO RELATED APPLICATION

This application is a continuation of and claims priority to U.S. patent application Ser. No. 15/041,917 which was filed on Feb. 11, 2016 and is entitled "Payment Device Enrollment in Linked Offers." The entire contents of the aforementioned application is expressly incorporated by reference herein.

FIELD OF TECHNOLOGY

The present disclosure relates to a method and system for automatically linking promotions and coupons to a payment device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Promotions, discounts, and other forms of marketing documents that implement a marketing procedure to give a benefit to a consumer in exchange for purchasing a particular product or service or other benefit in a quid pro quo arrangement may be linked to a payment device such as a credit card. In current payment device systems, the process to link a marketing document to a payment device requires the Primary Account Number ("PAN") for the payment device. Further, third parties (i.e., marketing document publishers and not either of the PAN owner or a financial institution that issued the PAN to the owner) who offer the marketing documents to the PAN owner are responsible for collection of the PAN and complete the linking process. Sharing and collecting PANs by third parties presents a security and privacy risk for both the PAN owner and the issuing financial institution. Increasingly, there is a need for a method to link a PAN to a marketing document without exposing the PAN owner and issuing financial institution to this risk.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A computer implemented system and method may present a solution to the security risks described above. In some embodiments, the solution may include a graphic object that is managed by the issuing financial institution and presented with the marketing documents. A payment processing server may be configured to create a dynamic graphic object and send that object to a user's computing device in response to a request for display at the user computing device. The dynamic graphic object may be configured by the payment processing server using information or an alias for information from the issuing financial institution (e.g., the user's PAN and other information). The object may also include instructions to link the PAN to an alias for the user such as an email address, phone number, a computing device, or other identifying information that would not pose a serious security risk if known by a third party. In some embodiments, the dynamic graphic object may also include a graphic image of a user's payment device including the PAN so that the user may easily recognize a payment device to link to the marketing documents.

In some embodiments, a payment device and marketing protocol linking system may include a payment processing server and a marketing documents server. The payment processing server may configure a dynamic button object using at least an alias for consumer account data and marketing documents data. The consumer account data may correspond to a payment device. The marketing documents server may send marketing documents data of the dynamic button object to a consumer computing device via a computer network. In response to receiving a request from a consumer computing device, the payment processing server may link the alias to the marketing documents data sent to the consumer computing device.

In further embodiments, a computer-implemented method may link a payment device to marketing documents data. The method may configure a dynamic button object at a payment processing server. The dynamic button object may include an alias and indicate marketing documents data. The alias may correspond to a payment device and consumer account data communicatively coupled to the payment processing server. In response to a first request from a consumer computing device, the method may send the dynamic button object from the payment processing server to the consumer computing device via a computer network. In response to a second request from the consumer computing device, the method may send the indicated marketing documents data to the consumer computing device. In response to a third request from the consumer computing device, the method may link the alias to the indicated marketing documents data and the consumer computing device.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
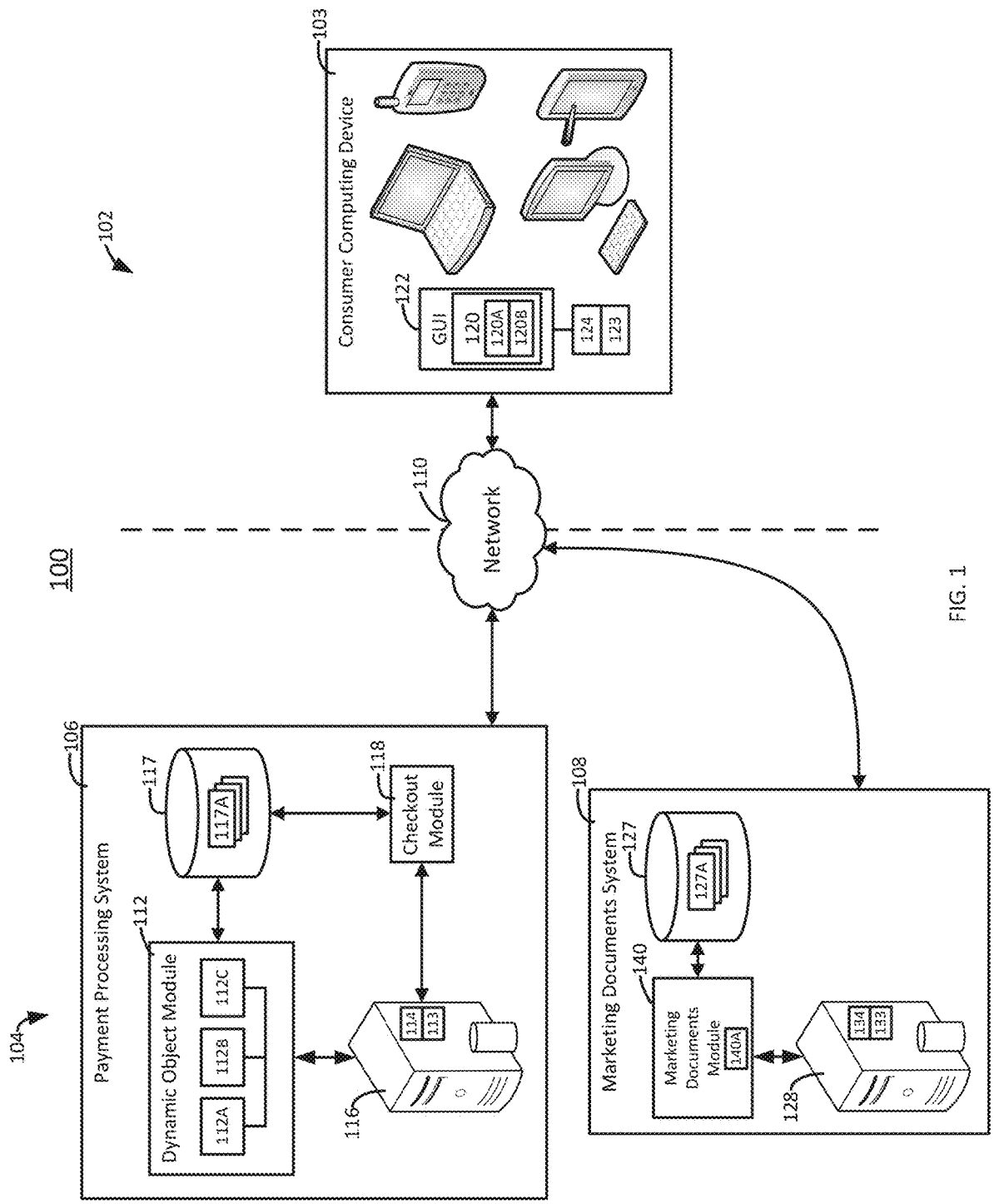
FIG. 1 illustrates a system for enrolling and linking a payment device to marketing documents, offers, and other information or dynamic objects.

FIG. 1 generally illustrates one embodiment of a system 100 for enrolling and linking a payment device to marketing documents, offers, and other information and dynamic objects as described herein. The system 100 may include front end components 102 (e.g., a user or customer computing device 103 such as a smart phone, a personal computer, tablet, etc.) and backend components 104 (e.g., a payment processing system 106 and a marketing documents system 108). The front end components 102 and backend components 104 may be in communication with each other via a communication link 110 (e.g., computer network, internet connection, etc.). The system 100 may include various software or computer-executable instructions and unique hardware components or modules that may employ the software and instructions to manage enrolling and linking a payment device to marketing documents, offers, and other information and dynamic objects as described herein. The various modules may be implemented as computer-readable storage memories containing computer-readable instructions (i.e., software) for execution by a processor of the computer system 100 within a specialized or unique computing device. The modules may perform the various tasks associated with enrolling and linking a payment device to marketing documents, offers, and other information and dynamic objects as described herein. The computer system 100 may also include both hardware and software applications, as well as various data communications channels for communicating data between the various specialized or unique front end 102 and back end 104 hardware and software components.

Figure 2A:
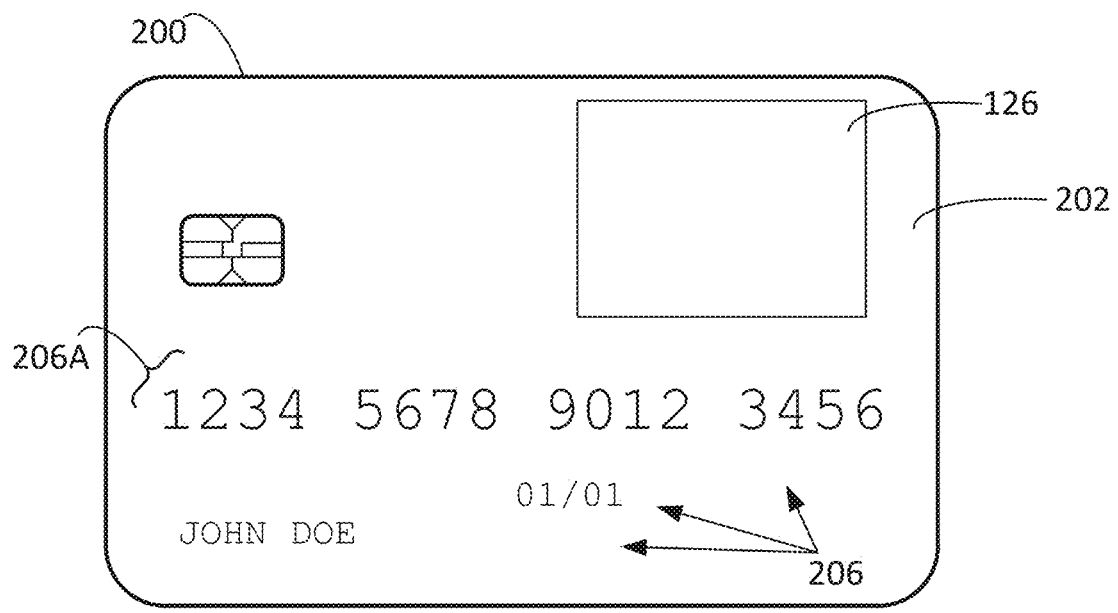
FIG. 2A illustrates a first view of an exemplary payment device for use with the system for enrolling and linking a payment device to marketing documents, offers, and other information or dynamic objects.
Figure 2B:
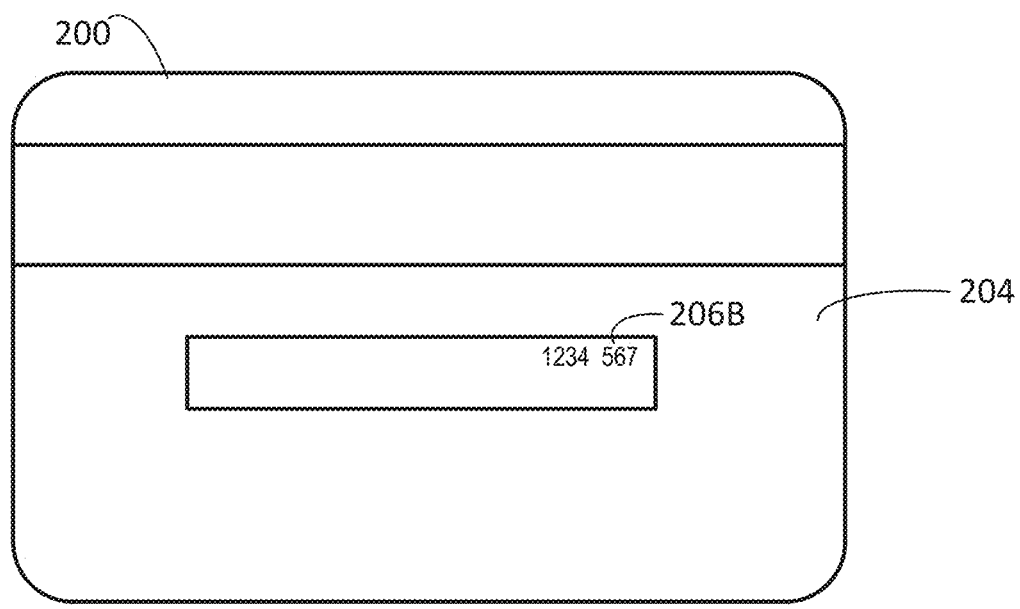
FIG. 2B illustrates a second view of an exemplary payment device for use with the system for enrolling and linking a payment device to marketing documents, offers, and other information or dynamic objects.

The payment processing system 106 may include one or more instruction modules including a dynamic object module 112 that, generally, may include instructions to cause a processor 114 of a payment processing server 116 to functionally communicate with a plurality of other computer-executable steps or modules 112A, 112B, and 112C. These modules 112, 112A-C may include instructions that, upon loading into the server memory 113 and execution by one or more computer processors 114, enroll and link a payment device 200 (FIGS. 2A and 2B) to marketing documents, offers, and other information and dynamic objects of the marketing documents system 108 as described herein.

A data repository 117 may include consumer account data profiles 117A that each include various pieces of data to describe an account of a payment device owner and user of the payment processing system 106. This data 117A may be embodied within the payment device 200 as described herein. With brief reference to FIGS. 2A and 2B, a payment device 200 may take on a variety of shapes and forms. In some embodiments, the payment device 200 is a traditional card such as a debit card or credit card. In other embodiments, the card may be a fob on a key chain. As long as the payment device 200 may be able to communicate securely with a payment accepting device, the form of the payment device may not be especially critical and may be a design choice. For example, many legacy payment devices 200 may have to be read by a magnetic stripe reader and thus, the payment device 200 may have to be sized to fit through a magnetic card reader. In other examples, the payment device 200 may communicate through near field communication and the form of the payment device 200 may be virtually any form. Of course, other forms may be possible based on the use of the card, the type of reader being used, etc.

Physically, the payment device 200 may be a card and the card may have a plurality of layers to contain the various elements that make up the payment device 200. In one embodiment, the payment device 200 may have a substantially flat front surface 202 and a substantially flat back surface 204 opposite the front surface 202. Logically, in some embodiments, the faces 202, 204 may have some embossments 206 including a Primary Account Number ("PAN") 206A and a Card Verification number ("CVN") 206B.

Returning to FIG. 1, a checkout module 118 may include various instructions that, upon execution by the processor 114, facilitate a user employing a payment device 200 for a financial transaction and linking promotions and coupons to the payment device 200 without exposing sensitive data (e.g., the user's PAN) to third parties that offer the promotions and coupons. The module 118 may include instructions that, upon loading into the server memory 113 and execution by one or more computer processors 114, allow the user to employ the payment device 200 and his or her corresponding account data 117A to complete a payment using, for example, the PAN 206A and other data and also coordinate with the dynamic object module 112 and the marketing document system 108 to facilitate enrolling and linking the payment device 200 to marketing documents, offers, and other information and dynamic objects as described herein. In some embodiments, the checkout module 118 may include instructions to process payments during an online financial transaction between the consumer computing device 103 and an online merchant. For example, the module 118 may include instructions to access account data 117A corresponding to the consumer initiating the transaction and approve or deny a payment amount to a merchant via the network 110. The module 118 may also call one or more APIs of the dynamic object module 112 to enroll the user in promotions or other offers as managed by the marketing documents system 108.

The checkout module may also include instruction s to coordinate execution of instructions by the dynamic object module 112 to create a dynamic button object 120. For example, a graphic object module 112A may include instructions to cause an application executing on the user computing device 103 to display the dynamic button object 120 within a Graphic User Interface ("GUI") 122 of the user computing device 103. In some embodiments, the GUI 122 may include a browser or other application stored in a memory 123 and executed on a processor 124 of the computing device 103 to display the dynamic button object 120. The dynamic button object 120 may include several elements including a token 120A, and a marketing document graphic object 120B, as described herein.

The token module 112B may include instructions to create a set of instructions or a token to link data (e.g., promotions, coupons, etc.) from the marketing documents system 108 to the payment device 200 and its corresponding account data 117A. In some embodiments, the set of instructions may be created by the token module 112B. The set of instructions may include what is commonly known as a cookie.

Cookies are small pieces of text stored on a user's computer 103 by the user's web browser 122. A cookie is made up of one or more name-value pairs containing bits of information. When a user requests information from a web server, the name portion of the cookie is set by the server that receives that web request and the value portion is a random value that allows identification of the requestor.

In some embodiments, when a user selects the dynamic button object 120 within the GUI 122, the GUI 122 executes instructions associated with the object 120 to request information from the backend components 104 and facilitate the linking process described herein. For example, the GUI 122 may execute instructions to request information from the payment processing server 116, and the payment processing server 116 may further request information from a marketing documents server 128. In other embodiments, GUI 122 executes instructions to request information 127A directly from a marketing documents server 128. In some embodiments, the information 127A includes an ad unit or offer wall object for display within the GUI 122. The payment processing server 116 or the marketing document server 128 may then set a name portion of the token 120A to the respective server name and the value portion of the token 120A to a value that identifies the user of the computing device 103 that corresponds to a record of the account data 117A. In some embodiments, this value may be a random number, an email address, device identifier, or other data that is an alias for the user. The value may then be stored by the payment processing system 106 or marketing documents system 108 to identify the user. Importantly, this value and name may then be used by the payment processing server 116 to mediate between user account data 117A and marketing documents 127A so that consumers can view and opt in to various offers without surrendering security-sensitive date such as their PAN. In some embodiments, the payment processing system 106 in general and the checkout module in particular may include instructions to monitor for transactions with a merchant associated with marketing data 127A that was sent to the consumer computing device 103 in response to the user selection of a dynamic button object 120. The system 106 may then execute instructions to apply any discounts or credits described by the data 127A to the monitored transaction. The system 106 may also authenticate a consumer as the owner of a particular payment device 200 used in the transaction.

A graphic object module 112C of the dynamic object module 112 may associate a marketing document graphic object 120B with the dynamic button object 120 displayed within the GUI 122 that represents marketing data 127A and/or the account data 117A. For example, the graphic object 120B may include text or an image describing a particular promotion, coupon, or other service that, upon selection of the object 1206 by the consumer, links the consumer's account data 117A to a particular marketing data 127A. The object 120B may also include a graphic element. For example, the graphic element may include an image of the consumer's payment device 200 that the consumer may use to associate the device 200 and the corresponding account data 117A to the marketing data 127A.

The marketing documents system 108 may also include a marketing documents server 128 including a memory 133 and processor 134. A marketing documents module 140 may include instructions that, when executed by the processor 134, cause the system 108 to send marketing documents data 127A or an indication of the marketing documents data 127A (e.g., a link to a network file for the marketing documents data 127A, an embodiment of the data, etc.), to the consumer computing device 103 via the network 110. For example, the marketing documents module 140 may include a marketing documents API 140A which includes instructions to facilitate linking the payment device 200 to the marketing documents 127A by communicating with the payment processing server 116 without exposing sensitive information (e.g., the consumer's PAN) to a third party. In some embodiments, the API 140A includes instructions to cause the system 108 to send an add unit or other documents 127A to the consumer computing device 103 in response to selection of a dynamic button object 120 within the GUI 122 of the device 103. The system 108 may send marketing data 127A to the consumer computing device 103 via the payment processing system, which, in turn, sends the data 127A to the consumer computing device 103.

Figure 3:
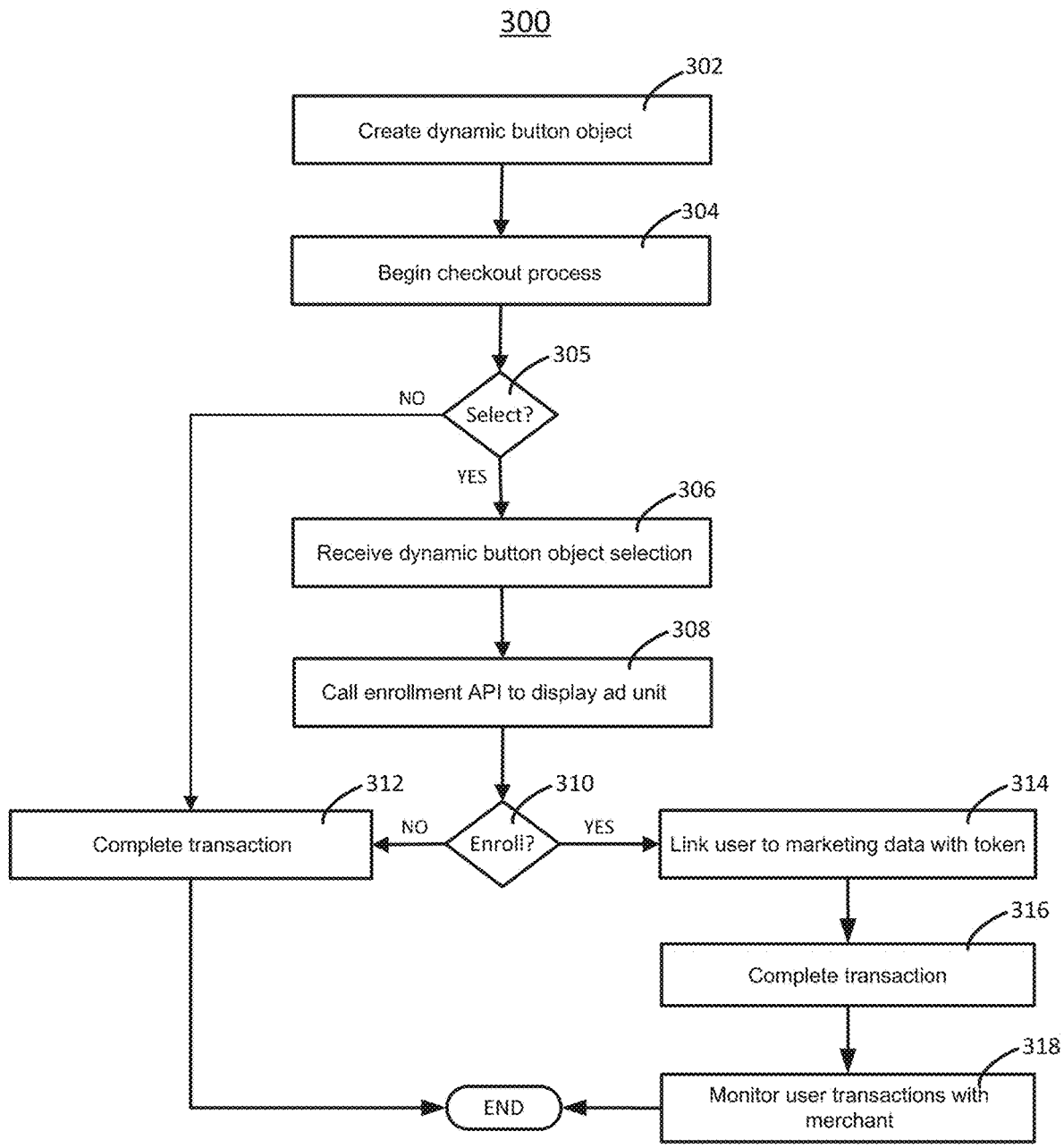
FIG. 3 illustrates a process flow for enrolling and linking a payment device to marketing documents, offers, and other information or dynamic objects using the system of FIG. 1.

With reference to FIG. 3, the system 100, generally, and processors 114, 124, 134 of the payment processing server 116, consumer computing device 103, and/or marketing documents server 128, respectively, described herein may execute a method 300 to link promotions, coupons, and other marketing data 117A to a payment device 200 without exposing sensitive account information to the third parties that manage the marketing data 117A. Each various "step" described herein may correspond to one or more computer-executable instructions of the modules of the system 100 as executed on one or more processors such as processors 114, 124, and 134.

At step 302, the method 300 may cause one or more processors to execute instructions to create the dynamic button object 120. In some embodiments, step 302 may include instructions to associate a token 120A and a marketing document graphic object 120B with the dynamic button object 120. As described above, the token 120A may include a cookie or other text or instructions to allow an alias to be associated with the account data 116A of a consumer.

At step 304, the method 300 may cause one or more processors to execute instructions to begin a checkout process. For example, in response to a first request from the consumer computing device 103, the payment processing system 106 may cause the GUI 122 of the consumer computing device 103 to display one or more graphic objects that indicate a payment option using the payment device 200 and send the dynamic button object 120 to the consumer computing device to display at least a graphic portion of the object during the checkout process. For example, a "Visa Checkout" icon may indicate a payment option using a payment device 200 associated with the VISA® payment processing network and the graphic portion of the dynamic button object 120 may display an image of a payment device corresponding to the consumer as well as an indication of the availability of marketing documents data corresponding to the proposed transaction, or the marketing documents data itself.

If, at step 305, the consumer selects the dynamic button object 120 at the consumer computing device 103, then at step 306, the method 300 may cause one or more processors to execute instructions to send and receive the dynamic button object selection. In some embodiments, the consumer computing device 103 may execute an instruction to send a second request, message, or instruction to the payment processing server 116 which, in turn, calls the marketing documents server 128. Marketing documents data 127A may then be sent to the consumer computing device 103 via the network 110 for display within the GUI 122 at the device 103. Thus, the payment processing system 106 may mediate communication between the consumer and the marketing document system 108 without exposing a PAN or other sensitive data to a third party. Otherwise, if, at step 305, the consumer does not select the dynamic button object 120 at the consumer computing device 103, then the method 300 may proceed to step 312, described below.

At step 308, the method 300 may cause one or more processors to execute instructions to call the marketing documents API 140A. In some embodiments, the API 140A may execute instructions to facilitate an enrollment process for the consumer device 103. For example, the step 308 may cause an enrollment form or other interface to be displayed within the GUI 122. The form may permit a consumer to enter alias or other information in order to facilitate the linking process described herein.

If, at step 310, the payment processing server 116 does not receive a third request, message, or instructions from the consumer device 103 to complete an enrollment process, then at step 312, the consumer may complete the transaction without linking the payment device 200 to the marketing documents 127A. Completing the transaction may cause the system 106 to execute instructions to apply any discounts or credits described by the data 127A to the monitored transaction. The system 106 may also authenticate a consumer as the owner of a particular payment device 200 used in the transaction.

If, at step 310, the payment processing server 116 receives a third request, message, or instructions from the consumer device 103 to complete an enrollment process, then the method 300 may proceed to step 314 and link the alias or other, non-sensitive portion of the dynamic button object 120 (e.g., the token 120A) to the payment device 200 without exposing any sensitive data (e.g., the consumer's PAN) to the third party marketing documents system 108. At step 316, the method 300 may cause one or more processors to execute instructions to complete the transaction initiated by the consumer device 103 and, at step 318, execute instructions to monitor any future transactions between the consumer device 103, and/or transactions including account data 127A for the transaction completed at step 316. As described above in relation to step 312, completing the transaction may include executing instructions to apply any discounts or credits described by the data 127A to the monitored transaction and authenticating a consumer as the owner of a particular payment device 200 used in the transaction. Generally monitoring user transactions at step 318 may include causing one or more of the processors to monitor for transactions with a merchant associated with marketing data 127A that was sent to the consumer computing device 103 in response to the user selection of a dynamic button object 120.

After executing the instructions associated with steps 312 or 318, the method 300 may end. Thus, the method 300 may cause the processors 114, 124, 134 of the respective payment processing server 116, consumer computing device 103, and marketing documents server 128 to execute instructions to manage enrolling and linking a payment device to marketing documents, offers, and other information and dynamic objects as described herein.

Figure 4:
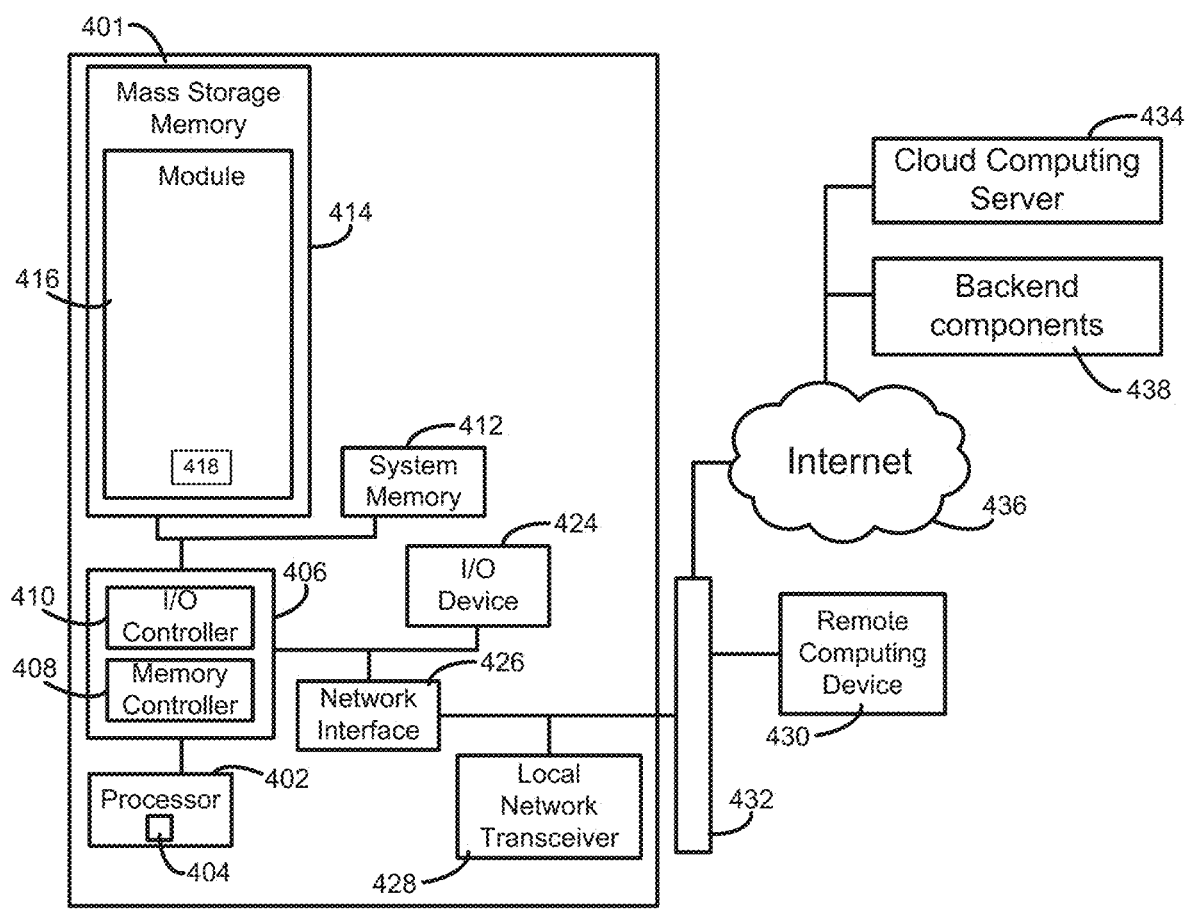
FIG. 4 illustrates a computing device used within the system for enrolling and linking a payment device to marketing documents, offers, and other information or dynamic objects and to implement the various process flows or methods described herein.

FIG. 4 is a high-level block diagram of an example computing environment 400 for the system and methods for enrolling and linking a payment device to marketing documents, offers, and other information and dynamic objects as described herein. The computing device 401 may include a server (e.g., the payment processing server 116, the marketing documents server 128, etc.), a mobile computing device (e.g., the consumer computing device 103, a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example systems and methods for enrolling and linking a payment device to marketing documents, offers, and other information and dynamic objects may be used to implement and execute the example systems of FIG. 1. Although the example system 400 is described below as including a plurality of peripherals, interfaces, chips, memories, etc., one or more of those elements may be omitted from other example processor systems used to implement and execute the example system for enrolling and linking a payment device to marketing documents, offers, and other information and dynamic objects. Also, other components may be added.

As shown in FIG. 4, the computing device 401 includes a processor 402 that is coupled to an interconnection bus. The processor 402 includes a register set or register space 404, which is depicted in FIG. 4 as being entirely on-chip, but which could alternatively be located entirely or partially off-chip and directly coupled to the processor 402 via dedicated electrical connections and/or via the interconnection bus. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus.

The processor 402 of FIG. 4 is coupled to a chipset 406, which includes a memory controller 408 and a peripheral input/output (I/O) controller 410. As is well known, a chipset typically provides I/O and memory management functions as well as a plurality of general purpose and/or special purpose registers, timers, etc. that are accessible or used by one or more processors coupled to the chipset 406. The memory controller 408 performs functions that enable the processor 402 (or processors if there are multiple processors) to access a system memory 412 and a mass storage memory 414, that may include either or both of an in-memory cache (e.g., a cache within the memory 412) or an on-disk cache (e.g., a cache within the mass storage memory 414).

The system memory 412 may include any desired type of volatile and/or non-volatile memory such as, for example, static random access memory (SRAM), dynamic random access memory (DRAM), flash memory, read-only memory (ROM), etc. The mass storage memory 414 may include any desired type of mass storage device. For example, if the computing device 401 is used to implement a module 416 (e.g., the various modules to enroll and link a payment device to marketing documents, offers, and other information and dynamic objects and other modules as herein described). The mass storage memory 414 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401 and the system 100. Thus, a module, block, function, operation, procedure, routine, step, and method can be implemented in hardware, firmware, and/or software. In one embodiment, program modules and routines are stored in mass storage memory 414, loaded into system memory 412, and executed by a processor 402 or can be provided from computer program products that are stored in tangible computer-readable storage mediums (e.g. RAM, hard disk, optical/magnetic media, etc.).

The peripheral I/O controller 410 performs functions that enable the processor 402 to communicate with a peripheral input/output (I/O) device 424, a network interface 426, a local network transceiver 428, (via the network interface 426) via a peripheral I/O bus. The I/O device 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 424 may be used with the module 416, etc., to receive data from the transceiver 428, send the data to the backend components of the system 100, and perform any operations related to the methods as described herein. The local network transceiver 428 may include support for a Wi-Fi network, Bluetooth, Infrared, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 408 and the I/O controller 410 are depicted in FIG. 4 as separate functional blocks within the chipset 406, the functions performed by these blocks may be integrated within a single integrated circuit or may be implemented using two or more separate integrated circuits. The computing environment 400 may also implement the module 416 on a remote computing device 430. The remote computing device 430 may communicate with the computing device 401 over an Ethernet link 432. In some embodiments, the module 416 may be retrieved by the computing device 401 from a cloud computing server 434 via the Internet 436. When using the cloud computing server 434, the retrieved module 416 may be programmatically linked with the computing device 401. The module 416 may be a collection of various software platforms including artificial intelligence software and document creation software or may also be a Java® applet executing within a Java® Virtual Machine (JVM) environment resident in the computing device 401 or the remote computing device 430. The modeling module 420 and the execution module 422 may also be "plug-ins" adapted to execute in a web-browser located on the computing devices 401 and 430. In some embodiments, the module 416 may communicate with back end components 438 such as the backend components 104 of FIG. 1 via the Internet 436.

The system 400 may include but is not limited to any combination of a LAN, a MAN, a WAN, a mobile, a wired or wireless network, a private network, or a virtual private network. Moreover, while only one remote computing device 430 is illustrated in FIG. 4 to simplify and clarify the description, it is understood that any number of client computers are supported and can be in communication within the system 400.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A payment device and marketing protocol linking system for linking a payment device to marketing documents data, the system comprising:
   a payment processing server including a processor and a memory, the memory storing instructions that are executable by the processor to:
   store consumer account data for a payment device, the consumer account data including a primary account number and a consumer alias;
   set a value portion of a cookie to the consumer alias;
   set a name portion of the cookie to a server name for the payment processing server;
   link the cookie with a dynamic button object, the dynamic button object indicating marketing documents data; and
   in response to selection of the dynamic button object, link the consumer account data to the marketing documents data based on the value portion of the cookie;
   wherein, a marketing documents server hosting the marketing documents data sends the marketing documents data to a consumer computing device corresponding to the consumer account data without exposing the primary account number to the marketing documents server in further response to selection of the dynamic button object.

2. The system of claim 1, wherein the instructions to set the value portion of the cookie to the consumer alias includes instructions to set the value portion of the cookie to the consumer alias in response to receiving a request from a consumer computing device and to send the dynamic button object to a consumer computing device corresponding to the consumer account data.

3. The system of claim 2, wherein the consumer alias includes one or more of a random number, an email address, and a device identifier for the consumer computing device.

4. The system of claim 3, wherein the marketing documents data includes one or more of an ad unit or an offer wall object for display within a GUI of the consumer computing device.

5. The system of claim 4, wherein the memory includes further instructions to monitor a transaction from the consumer computing device, the transaction including the value portion of the cookie and the product indicated by the marketing documents data.

6. The system of claim 5, wherein the memory includes further instructions to apply one or more of a discount or a credit described by the marketing documents to the transaction.

7. The system of claim 5, wherein the memory includes further instructions to authenticate the consumer as an owner of the consumer computing device used to complete the transaction.

8. The system of claim 1, wherein the dynamic button object further includes an image of the payment device.

9. A computer-implemented method for linking a payment device to marketing documents data hosted by a third-party server, the method comprising:
   storing consumer account data for a payment device, the consumer account data including a primary account number and a consumer alias;
   setting a value portion of a cookie to the consumer alias;
   setting a name portion of the cookie to a server name for the payment processing server;
   linking the cookie with a dynamic button object, the dynamic button object including marketing documents data; and
   in response to selection of the dynamic button object, linking the consumer account data to the marketing documents data based on the value portion of the cookie;
   wherein a marketing documents server hosting the marketing documents data sends the marketing documents data to a consumer computing device corresponding to the consumer account data without exposing the primary account number to the marketing documents server in further response to selection of the dynamic button object.

10. The computer-implemented method of claim 9, wherein the consumer alias includes one or more of a random number, an email address, and a device identifier for the consumer computing device.

11. The computer-implemented method of claim 10, wherein the marketing documents data includes one or more of an ad unit or an offer wall object for display within a GUI of the consumer computing device.

12. The computer-implemented method of claim 11, further comprising monitoring a transaction using the consumer alias for the consumer computing device, the transaction including the value portion of the cookie and the product indicated by the marketing documents data.

13. The computer-implemented method of claim 12, further comprising applying one or more of a discount or a credit described by the marketing documents to the transaction.

14. The computer-implemented method of claim 13, further comprising authenticating the consumer as an owner of the consumer computing device used to complete the transaction.

15. The computer-implemented method of claim 9, wherein the dynamic button object further includes an image of the payment device.

16. The computer-implemented method of claim 9, further comprising using the dynamic button object to prevent access to a primary account number corresponding to the consumer account data.

17. A computer-readable medium including processor-executable instructions that, upon execution by a computer processor, link a payment device to marketing documents data, the medium comprising instructions for:
   storing consumer account data for a payment device, the consumer account data including a primary account number and a consumer alias;
   setting a value portion of a cookie to the consumer alias;
   setting a name portion of the cookie to a server name for the payment processing server;
   linking the cookie with a dynamic button object, the dynamic button object including marketing documents data; and
   in response to selection of the dynamic button object, linking the consumer account data to the marketing documents data based on the value portion of the cookie;
   wherein a marketing documents server hosting the marketing documents data sends the marketing documents data to a consumer computing device corresponding to the consumer account data without exposing the primary account number to the marketing documents server in further response to selection of the dynamic button object.

18. The computer-readable medium of claim 17, wherein:
   the consumer alias includes one or more of a random number, an email address, and a device identifier for the consumer computing device;
   the marketing documents data includes one or more of an ad unit or an offer wall object for display within a GUI of the consumer computing device; and
   the dynamic button object prevents access to a primary account number corresponding to the consumer account data.

19. The computer-readable medium claim 17, further comprising instructions for:
   monitoring a transaction using the consumer alias for the consumer computing device, the transaction including the value portion of the cookie and the product indicated by the marketing documents data;
   applying one or more of a discount or a credit described by the marketing documents to the transaction; and
   authenticating the consumer as an owner of the consumer computing device used to complete the transaction.

20. The computer-readable medium of claim 17, wherein the dynamic button object further includes an image of the payment device.

* * * * *